US011292853B2

(12) United States Patent
Flack et al.

(10) Patent No.: US 11,292,853 B2
(45) Date of Patent: Apr. 5, 2022

(54) METHODS AND COMPOSITIONS FOR CURING A SURFACE OF AN UNCURED POLYSULFIDE RUBBER

(71) Applicant: The Boeing Company, Chicago, IL (US)

(72) Inventors: Matthew Alexander Flack, St. Louis, MO (US); Andrew M. Zweig, Ellsville, MO (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 16/797,471

(22) Filed: Feb. 21, 2020

(65) Prior Publication Data
US 2020/0190226 A1 Jun. 18, 2020

Related U.S. Application Data

(62) Division of application No. 15/804,395, filed on Nov. 6, 2017, now Pat. No. 10,597,468.

(60) Provisional application No. 62/534,970, filed on Jul. 20, 2017.

(51) Int. Cl.
*C08C 19/34* (2006.01)
*C08K 5/098* (2006.01)
*C08J 3/24* (2006.01)
*C08K 5/00* (2006.01)
*C08C 19/30* (2006.01)
*C08G 75/16* (2006.01)
*C09K 3/10* (2006.01)

(52) U.S. Cl.
CPC ............. *C08C 19/34* (2013.01); *C08C 19/30* (2013.01); *C08G 75/16* (2013.01); *C08J 3/245* (2013.01); *C08K 5/0008* (2013.01); *C08K 5/0025* (2013.01); *C08K 5/098* (2013.01); *C08J 2381/02* (2013.01); *C08J 2381/04* (2013.01); *C09K 3/1012* (2013.01)

(58) Field of Classification Search
None
See application file for complete search history.

(56) References Cited

U.S. PATENT DOCUMENTS

| | | | |
|---|---|---|---|
| 3,849,386 A | 11/1974 | Bernstein et al. | |
| 4,264,482 A | 4/1981 | Homan | |
| 5,612,402 A * | 3/1997 | Orecharova | C08G 18/10 524/437 |
| 9,062,139 B2 | 6/2015 | Rao et al. | |
| 10,597,468 B2 * | 3/2020 | Flack | C08C 19/34 |
| 2013/0109790 A1 * | 5/2013 | Fukushi | C09J 127/12 524/84 |
| 2013/0289215 A1 * | 10/2013 | Wang | C08K 9/04 525/281 |
| 2014/0275363 A1 * | 9/2014 | Iijima | C08K 5/43 524/99 |
| 2016/0039995 A1 * | 2/2016 | Suzuki | C08L 27/16 524/81 |
| 2017/0306181 A1 * | 10/2017 | Toolis | C09C 1/00 |

FOREIGN PATENT DOCUMENTS

| | | |
|---|---|---|
| CN | 1443230 A | 9/2003 |
| CN | 102 277 013 | 12/2011 |
| JP | 2002-179916 | 6/2002 |
| WO | 02/02710 A2 | 1/2020 |

OTHER PUBLICATIONS

Extended European Search Report prepared by the European Patent Office in application No. 20187870.9 dated Oct. 10, 2020.
Extended European Search Report prepared by the European Patent Office in application No. 18184317.8 dated Nov. 9, 2018.
Database WPI, Week 200266, Thomson Scientific, London, GB; An 2002-612045, XP002786053.
Database WPI, Week 201282, Thomson Scientific, London, GB; An 2012-A27732, XP002786054.
First Office Action dated Dec. 3, 2021, in Chinese Patent Application No. 201810801794X, i19 pages.
Zhao et al., "A Comprehensive Handbook of Synthetic Rubber Technology", Chemistry Industry Press, 2006, pp. 1186 and 1192.
Du et al., "China Adhesives", 2017, 26(6), pp. 35-38.

* cited by examiner

*Primary Examiner* — Joseph D Anthony
(74) *Attorney, Agent, or Firm* — McDonnell Boehnen Hulbert & Berghoff LLP

(57) ABSTRACT

Disclosed are compositions comprising a liquid carrier, a polysulfide rubber curing agent, a metal cation, and an ionic liquid. Also disclosed are methods for curing a surface of an uncured polysulfide rubber. These methods involve applying the disclosed compositions to the surface of the uncured polysulfide rubber.

21 Claims, No Drawings

METHODS AND COMPOSITIONS FOR CURING A SURFACE OF AN UNCURED POLYSULFIDE RUBBER

CROSS-REFERENCE TO RELATED APPLICATIONS

This application is a divisional of U.S. application Ser. No. 15/804,395, filed Nov. 6, 2017, which claims the benefit of priority to U.S. Provisional Application No. 62/534,970, filed Jul. 20, 2017, the disclosure of each of which is incorporated herein in its entirety.

FIELD

This disclosure relates to methods and compositions for curing a surface of an uncured polysulfide rubber.

BACKGROUND

Sealing of joints or gaps formed by connecting metal and other solid, e.g., glass, plastic, and carbon fiber, components of assemblies is necessary in many industries. For example, aircraft manufacturing requires sealing joints and gaps in fuel tank and wing assemblies. Various polymeric sealants, including polysulfide rubbers, can be used to seal such joints and gaps.

The surface of polysulfide rubber requires a lengthy period of time, i.e., typically at least several hours, to harden. Before its surface hardens and forms a skin (known as skin formation or skinning), i.e., while the surface of polysulfide rubber sealant remains soft, it is prone to gather debris from other manufacturing processes. For example, metal debris such as small aluminum turnings with sharp edges and points that result from drilling often are become imbedded into the sealant. Removal of such debris is time-consuming, and often requires repair of the sealant.

Avoiding the problems resulting from slow skinning by delaying subsequent manufacturing steps is unacceptable. Thus, compositions have been used to increase the skinning rate. These compositions include compounds that are understood to react with free thiol groups at the ends of polysulfide chains to form cross-links between polymer chains, thus causing the polymer seal to harden at its surface. An example of a compound used in these compositions is 1-(diethylthiocarbamoyldisulfanyl)-N,N-diethyl-methanethioamide, commonly known as disulfiram, which can be represented by the following chemical structure:

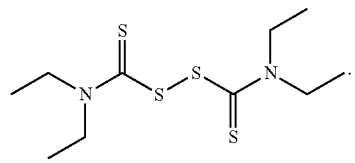 [SMILES: CCN(CC)C(=S)SSC(=S)N(CC)CC]

An example of a disulfiram-containing composition also contains magnesium acetate and flammable solvents (about 75-90% by weight methanol, as well as ethanol, toluene, ethyl acetate, and methyl isobutyl ketone). These products, although they tend to increase the skinning rate, are still inadequate. Skinning is still unacceptably slow, and the flammable solvents are relatively slow to evaporate and also create safety issues.

Compositions containing hexavalent chromium ($Cr^{6+}$) in flammable solvent(s) can also be used to increase the rate of skin formation. These compositions, of course, pose severe environmental and exposure problems.

Therefore, there is a need for compositions capable of causing rapid skin formation on polysulfide rubber sealants that are environmentally friendly and safe.

SUMMARY

In one aspect, this disclosure provides compositions that contain an ionic liquid in combination with a polysulfide rubber curing agent. In certain embodiments, these compositions further include a liquid carrier and/or a metal cation. The ionic liquid can dissolve the polysulfide curing agent or increase its solubility in liquid carrier systems in which the polysulfide curing agent is insufficiently soluble.

In another aspect, this disclosure provides methods for curing a surface of an uncured polysulfide rubber. These methods comprise contacting the uncured polysulfide rubber with a composition comprising a polysulfide rubber curing agent, a metal cation, an ionic liquid, and a liquid carrier.

In still another aspect, this disclosure provides compositions comprising a liquid carrier, a polysulfide rubber curing agent, a metal cation, and an ionic liquid.

Still another aspect of this disclosure provides methods for sealing joints between solid surfaces on an aircraft. These methods comprise applying a polysulfide rubber sealant to the joint to form an uncured seal on the joint, and contacting the uncured seal with a composition comprising a polysulfide rubber curing agent, a metal cation, an ionic liquid, and a liquid carrier.

The compositions of this disclosure result in improved rates of skin formation.

DETAILED DESCRIPTION

The term "alkenyl" as used herein refers to an unsubstituted hydrocarbon group having from 2 to 8 carbon atoms, preferably from 2 to 4 carbon atoms, and having at least including one olefinic double bond, e.g. vinyl, allyl, and the like. Alkenyl substituents may optionally be substituted with 1-3 substituents chosen from alkyl, carboxy, carboxyalkyl, aminocarbonyl, alkoxy and cyano each having from 1 to 6 carbon atoms; $CF_3$; amino; and $-S(O)_nR$, where R is alkyl, aryl, or heteroaryl and n is 0, 1 or 2.

As used herein, the term "alkenylene" refers to a bivalent acyclic carbon group having, for example, from 2-6 carbon atoms, which contains at least one carbon-to-carbon double bond and is represented by the formula $-(C_nH_{2n-2})-$.

The term "alkyl" as used herein denotes a linear or branched acyclic alkyl group containing from 1 to about 26 carbon atoms. In some embodiments, alkyl is a lower alkyl having from 1 to 10 carbons atoms, or more narrowly from 1 to 6 carbon atoms or even more narrowly from 1 to 3 carbon atoms. Examples of lower alkyl moieties include, but are not limited to methyl, ethyl, n-propyl, isopropyl, n-butyl, isobutyl, sec-butyl, and tert-butyl. In other embodiments, alkyl refers to alkyl groups having from 10-26 carbon atoms, or more narrowly from 16-22 carbon atoms. Examples of 10-26 carbon atoms alkyl groups include lauryl and stearyl groups. In certain embodiments, alkyl groups are optionally substituted with 1-3 substituents chosen from alkyl, carboxy, carboxyalkyl, aminocarbonyl, alkoxy and cyano each having from 1 to 6 carbon atoms; $CF_3$; amino; and $-S(O)_nR$, where R is alkyl, aryl, or heteroaryl and n is 0, 1 or 2.

As used herein, the term "alkylene" refers to a bivalent acyclic hydrocarbon group having, for example, from 1-6 carbon atoms, and is represented by the formula —($C_nH_{2n}$)—.

The term "aryl" as used herein refers to an aromatic hydrocarbon ring system containing at least one aromatic ring. The aromatic ring may optionally be fused or otherwise attached to other aromatic hydrocarbon rings or non-aromatic hydrocarbon rings. Examples of aryl groups include, for example, phenyl, naphthyl, 1,2,3,4-tetrahydronaphthalene and biphenyl. Particular examples of aryl groups include phenyl, naphthyl, and anthracenyl. The aryl groups of the invention may be substituted with various groups. Thus, any carbon atom present within an aryl ring system and available for substitution may be further bonded to a variety of ring substituents, such as, for example, halogen, hydroxy, nitro, cyano, amino, $C_1$-$C_8$salkyl, $C_1$-$C_8$salkoxy, mono- and di($C_1$-$C_8$salkyl)amino, $C_3$-$C_{10}$cycloalkyl, ($C_3$-$C_{10}$cycloalkyl)alkyl, ($C_3$-$C_{10}$cycloalkyl)alkoxy, $C_2$-$C_9$heterocycloalkyl, $C_1$-$C_8$alkenyl, $C_1$-$C_8$alkynyl, halo($C_1$-$C_8$)alkyl, halo($C_1$-$C_8$)alkoxy, oxo, amino($C_1$-$C_8$)alkyl, mono- and di($C_1$-$C_8$alkyl)amino($C_1$-$C_8$)alkyl, $C_1$-$C_8$acyl, $C_1$-$C_8$acyloxy, $C_1$-$C_8$sulfonyl, $C_1$-$C_8$thio, $C_1$-$C_8$sulfonamido, $C_1$-$C_8$aminosulfonyl.

The term "alkylsulfate" as used herein refers to an anion of the corresponding alkyl hydrogen sulfate and having the formula R—O—$SO_3$— where R is an alkyl group. Alkylsulfates are typically obtained as sodium, potassium, or ammonium salts of the alkyl hydrogen sulfate. In certain embodiments, the alkyl group has from 10-26 carbon atoms.

The term "arylsulfate" as used herein refers to an anion of the corresponding aryl hydrogen sulfate and having the formula Ar—O—$SO_3$—, where Ar is an aryl group. Arylsulfates are typically obtained as sodium, potassium, or ammonium salts.

The term "alkylsulfonate" as used herein refers to an anion of an alkyl sulfonic acid and having the formula R—$SO_3$— where R is an alkyl group. Akylsuifonates are typically obtained as sodium, potassium, or ammonium salts. In certain embodiments, the alkyl group has from 10-26 carbon atoms.

The terms "fluorinated alkylsulfate" and "fluorinated alkylsulfonate" refer respectively to an alkyl sulfate or alkylsulfonate as defined herein wherein one or more, and typically all, of the alkyl group hydrogen atoms are replaced by fluorine atoms.

The term "fluoroalkylsulfonylimide" refers to anionic group of the formula ($RSO_2$)2N— where each R is independently an alkyl group wherein one or more, and typically all, of the alkyl group hydrogens are replaced by fluorine atoms.

The term "thiosalicylate" refers to an anion of the formula:

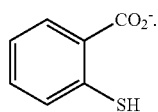

The term "dicyanamide" refers to an ion of the formula:

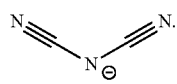

The term "halide" refers to anions of fluorine, bromine, chlorine, and iodine atoms, i.e., $F^-$, $Br^-$, $Cl^-$, and $I^-$.

The term "polysulfide rubber" refers to a polymer comprising chains containing sulfur-sulfur linkages connecting short alkylene, alkenylene, and/or alkylene ether units wherein the polymer chain is terminated by reactive mercaptan groups. The terminal mercaptan groups can be used for cross- or interlinking polymer chains. The sulfur content is relatively high, making the polymer a high-density material with a high resistance to hydrocarbons. Polysulfide rubbers are often referred to as elastomeric sealants.

The term "joint" refers to a point at which parts or components of a structure are joined or connected together and held in place, typically by a fastener such as a bolt, screw, or rivet. The parts and components can be metal, such as aluminum or titanium, glass, plastic, or carbon fiber. Normally, gaps exist between the parts at the joint and between the parts and the fastener. The term "gap" refers to the area or void between the connected parts and the fasteners. Thus, as used herein, sealing of joints and gaps refers to filing the joint or space to prevent fluid, i.e., liquid and gas, communication through the joint or gap. Accordingly, sealant can also be applied over a fastener, e.g., both heads of a rivet or the head and nut of a bolt.

This disclosure provides compositions and compositions for curing a surface of an uncured polysulfide rubber. The compositions comprise a liquid carrier, a polysulfide rubber curing agent, a metal cation, and an ionic liquid. The methods comprise contacting the uncured sealant with a composition comprising a polysulfide rubber curing agent, a metal cation, an ionic liquid, and a liquid carrier.

The materials that may be cured using the methods and compositions disclosed herein are polysulfide rubbers having terminal mercaptan, i.e., —SH, groups that are capable of forming intermolecular cross-links between polymer chains. In an embodiment, the sulfur content of the polysulfide rubber ranges from about 30 to about 85 percent by weight. In another embodiment, the sulfur content is about 30-40 percent by weight; in yet another embodiment, the sulfur content of the polysulfide rubber is about 35-39 weight percent.

Representative examples of suitable polysulfides are

| | |
|---|---|
| poly(ethylene disulfide) | —($SCH_2CH_2S$)$_n$— |
| poly(ethylene tetrasulfide) | —($S_2CH_2CH_2S_2$)$_n$— |
| poly(ethyl ether disulfide) | —($SCH_2CH_2OCH_2CH_2S$)$_n$— |
| poly(ethyl ether tetrasulfide) | —($S_2CH_2CH_2OCH_2CH_2S_2$)$_n$— |
| poly(ethyl formal disulfide) | —($SCH_2CH_2OCH_2OCH_2CH_2S$)$_n$— |
| poly(pentamethylene disulfide) | —($SCH_2(CH_2)_3CH_2S$)$_n$— |
| poly(hexamethylene disulfide) | —($SCH_2(CH_2)_4CH_2S$)$_n$— |
| poly(butyl formal disulfide) | —($SCH_2(CH_2)_3OCH_2OCH_2(CH_2)_3S$)$_n$— |
| poly(butyl ether disulfide | —($SCH_2(CH_2)_3OCH_2(CH_2)_3S$)$_n$— |

Another example of a suitable polysulfide rubber is a copolymer of a dihalogenated alkyl- or alkyl ether monomer, a trihaloalkyl, monomer, and sodium disulfide, sodium trisulfide, or sodium tetrasulfide.

Representative polysulfide rubbers include:

including Thioplast® MTMS 81 XPHF, Thioplast® MTMS 81 XPHQ, Thioplast® MTMS 81 XPIC, Thioplast® MTMS 81 XPHX, and Thioplast® MTMS81 XPHY.

| Polymer | Polysulfide rubber | MW (weight average, g/mol) |
|---|---|---|
| 1 | 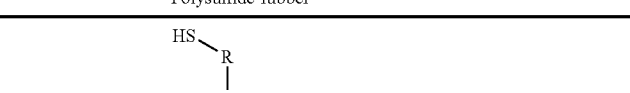 | 1000-6500 |
| 2 | 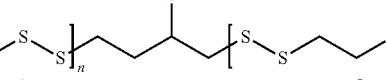 | 1300-3500 |

Polymer 1 can be prepared by using appropriate amounts of a monomer dihalide, e.g., bis(2-chloroethoxy)methane, a co-monomer trihalide, 1,2,4-trichlorobutane, and co-monomer disulfide, trisulfide, or tetrasulfide. In an embodiment, Polymer 1 has about 37-38% by weight of sulfur.

Particular embodiments of Polymer 1 include polysulfide rubbers containing about 37-38% by weight of sulfur and the following characteristics:

| | Polymer | | | | | | |
|---|---|---|---|---|---|---|---|
| | 1A | 1B | 1C | 1D | 1E | 1F | 1G |
| MW (g/mol) | 3900-4300 | 5000-6500 | 3300-3700 | 3900-4400 | 2100-2600 | 2400-3100 | <1100 |
| SH content (weight %, in grams of SH/grams of polymer) | 1.5-1.7 | 1.0-1.3 | 1.8-2.0 | 1.5-1.7 | 2.5-3.1 | 2.1-2.7 | >5.9 |
| Density (g/cm$^3$) | 1.285 | 1.310 | 1.286 | 1.285 | 1.285 | 1.285 | 1.259 |
| Viscosity (Pa * s) | 38-50 | 80-145 | 41-52 | 38-50 | 10-20 | 10-20 | max. 1.3 |

Particular embodiments of Polymer 2 include polysulfide rubbers containing about 29-30% by weight of sulfur and the following characteristics:

| | Polymer | | | | |
|---|---|---|---|---|---|
| | 3A | 3B | 3C | 3D | 3E |
| MW (g/mol) | About 1300 | About 3100 | About 3500 | About 3400 | About 3500 |
| SH content | 4.9-5.4 | 2.0-2.3 | 1.7-2.2 | 1.98 | 1.78-2.0 |
| Density (g/cm$^3$) | 1.18 | 1.18 | 1.18 | 1.18 | 1.18 |
| Viscosity (Pa * s) | 1.3-1.7 | 10-14 | 9-11 | 14.4 | 8 |

Polymers such as Polymers 1 and 2 are commercially available from AkzoNobel as Thioplast® G type polymers, Other polymers for use as the polysulfide rubber include the Permapol® series of polymers, including Permapol® P2 polymers, Permapol® P3 polymers, and Permapol® polymers, available from PPG Aerospace/PRC-DeSoto International, Inc.

Particular Permapol® P3 polymers suitable for use as the polysulfide rubbers contain about 28-30% by weight of sulfur and have the following characteristics:

| | Polymer | | | |
|---|---|---|---|---|
| | 2A | 2B | 2C | 2D |
| MW (g/mol) | 2000 | 4200 | 2400 | 5500 |
| SH content | 3.3 | 1.57 | 3.3 | 1.94 |
| Density (g/cm$^3$) | 1.16 | 1.16 | 1.16 | 1.16 |
| Viscosity (Pa * s) | 5 | 20 | 12.5 | 50 |

Other suitable polysulfide rubbers include those of Formula I below:

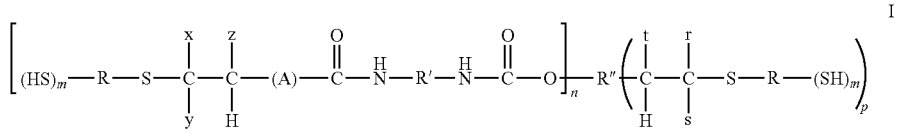

wherein
each of x, y and z is hydrogen, hydrocarbon, alkoxy, phenoxy, or halogenated derivatives thereof;
each of r, s and t is hydrogen or lower alkyl;
m is an integer between 1 and 2;
n is an integer between 1 and 4;
p is an integer from 0 to 3;
the sum of n and p is between 2 and 4;
R' is a divalent organic radical;
R" is the backbone of a liquid polymer precursor;
R1 is the grouping of the polymercapto organic compound $R-(SH)_{m+1}$; and
A is the fragment or grouping of an organic olefinic precursor compound having an active hydrogen: -A-C-C(z)=C(x)(y).

Specific examples of polysulfide rubbers encompassed by Formula I are disclosed in U.S. Pat. No. 3,923,748, the disclosure of which is incorporated herein in its entirety.

Still other suitable polysulfide rubbers include liquid polythioethers disclosed in U.S. Pat. No. 4,366,307, the disclosure of which is incorporated herein in its entirety. The polythioethers disclosed there have repeating units of Formula II below:

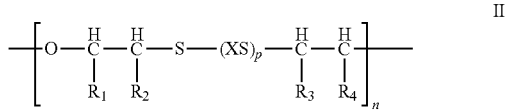

wherein
each of $R_1$, $R_2$, $R_3$ and $R_4$ is hydrogen or lower alkyl providing that a sufficient number of $R_1$, $R_2$, $R_3$ and/or $R_4$ are lower alkyl in said polymeric backbone to render said backbone non-crystallizing;
X is a divalent organic radical selected from —$CH_2$—$CH_2$—, —$CH_2$—$CH_2$—$CH_2$—$CH_2$—, —$CH_2$—$CH_2$—S—$CH_2$—$CH_2$— or —$CH_2$—$CH_2$—O—$CH_2$—$CH_2$—;
n is 8 to 200; and
p is 0 or 1

Still other suitable polysulfide rubbers include liquid polythioethers disclosed in U.S. Pat. No. 4,609,762, the disclosure of which is incorporated herein in its entirety. The liquid polythioethers disclosed there have Formula III and IV, shown below:

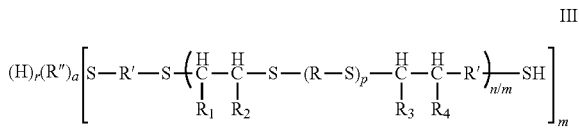

wherein
each of $R_2$ and $R_3$ is hydrogen or lower alkyl;
each of $R_1$ and $R_4$ is lower alkyl,
R is lower alkylene or lower alkylene thioether,
p is 0 to 3,
R' is any organic divalent radical having no chemically reactive groups such as lower alkylene, lower alkylene thioether, lower alkyl aryl, or lower alkyl heterocyclic,
R" is a tri- or tetravalent organic group derived from an organic compound having the formula R"-(Z), wherein Z is a primary mercaptan or a secondary hydroxyl located beta to a sulfur atom,
q is 3 or 4, and
wherein R" has no chemically reactive groups other than the hydroxyl or primary mercaptan,
n is from about 8 to 200,
q is 3 or 4, r is 0 or 1, a is 0 or 1, the sum of r and a being 1, m is 1, 3, or 4, when m is 1,
r is 1 and when m is 3 or 4, a is 1.

As defined in in U.S. Pat. No. 4,609,762, the term "chemically reactive groups" as used in the definitions for Formula III means groups such as, for example, disulfide linkages, ether linkages, halide groups, and ester linkages.

Formula IV is:

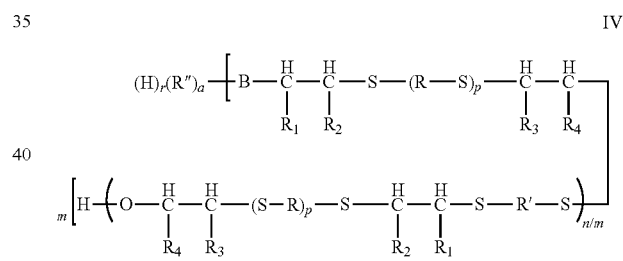

wherein R, a, p, n, m, $R_1$, $R_2$, $R_3$, $R_4$, R', and R" are as defined above for Formula III, and B is oxygen if Z is hydroxyl, and sulfur if Z is mercaptan.

Polysulfide rubbers, methods for their preparation, their characteristics, and their uses are described in Polyethers, Part III, Polyalkylene Sulfides and Other Polythioethers, N. Gaylord, Ed., John Wley & Sons, Inc. 1962, the disclosure of which is incorporated herein in its entirety.

The compositions and methods disclosed herein employ a metal cation. In an embodiment the metal cation is $Zn^{2+}$, $Pb^{2+}$, $Pb^{4+}$, $Fe^{2+}$, $Ca^{2+}$, $Sb^{2+}$, $Sb^{5+}$, $As^{3+}$, $As^{5+}$, $Ba^{2+}$, $Mn^{4+}$, $Cr^{3+}$, $Cu^{2+}$, $Co^{2+}$, $Mg^{2+}$, $Se^{4+}$, or $Te^{4+}$. In another embodiment, the metal cation is $Mg^{2+}$, and may be incorporated into the composition as magnesium acetate.

Without wishing to be bound by theory, it is believed that the metal cation coordinates or complexes the reduction product of the polysulfide curing agent. Also, the metal cation, when present as a hydrate compound, can provide water to the composition.

The metal cation is used in the methods and compositions described herein in an amount effective to form a complex with the reduction product of the polysulfide curing agent.

More specifically, the metal cation may be present in the composition at from about 0.05% to about 4% by weight of the composition. In certain embodiments, the amount of the metal cation is from about 0.1% to about 3%, or about 0.25 to about 2.5%, or about 0.5 to about 2% or about 0.5 to about 1%, by weight of the composition The compositions and methods disclosed herein employ one or more polysulfide curing agents. The polysulfide curing agent used herein may be a metal oxide, a metallic peroxide, an inorganic oxidizing agent, an organic oxidizing agent, a quinoid compound, a sulfur-containing compound, a difunctional cross-linking agent, or mixture thereof.

In certain embodiments, the amount of the polysulfide curing agent in the composition is from about 0.05% to about 10% by weight based on the weight of the composition.

In other embodiments, the amount of the polysulfide curing agent in the composition is from about 0.05% to about 5% by weight based on the weight of the composition.

In still other embodiments, the amount of the polysulfide curing agent in the composition is from about 0.1% to about 5% by weight based on the weight of the composition.

In still another embodiment, the amount of the polysulfide curing agent in the composition is from about 0.5% to about 4% by weight based on the weight of the composition, or from about 1% to about 4% by weight based on the weight of the composition, or from about 2% to about 3% by weight based on the weight of the composition.

In an embodiment, the polysulfide rubber curing agent is a metal oxide. Representative examples include ZnO, PbO, FeO, CaO, $Sb_2O_3$, $Sb_2O_5$, $As_2O_3$, $As_2O_5$, BaO, $Cr_2O_3$, CuO, CoO, $Pb_3O_4$, MgO, $ZnO_2$, $PbO_2$, $CaO_2$, $MgO_2$, $SeO2$, $TeO_2$, $BaO_2$, $NaBO_3 \cdot 4H_2O$, $MnO_2$, and mixtures thereof.

In an embodiment, the polysulfide rubber curing agent is an inorganic oxidizing agent. Examples 3include compounds such as $ZnCrO_4$, $PbCrO_4$, $K_2CrO_4$, $(NH_4)_2Cr_2O_7$, and $Na_2CrO_4$, and mixtures thereof.

In an embodiment, the polysulfide rubber curing agent is an organic oxidizing agent. Representative organic oxidizing agents include compounds such as urea peroxide, t-butyl hydroperoxide, t-butyl peroxybenzoate, dinitrobenzene, trinitrobenzene, benzoyl peroxide, cumene hydroperoxide, stearoyl peroxide, lauroyl peroxide, methyl ethyl ketone peroxide, p-quinone dioxime, dimethylglyoxime, quinone, benzothiazyl disulfide, disulfiram, dinitrobenzene salt of mercaptobenzothiazole, mercaptobenzothiazole, and mixtures thereof.

Alternatively, the polysulfide curing may be a compound comprising two functional groups, i.e., a difunctional cross-linking agent, independently selected from epoxides, isocyanates, acrylates, allyl groups. Representative examples include tripropylene glycol diacrylate, difunctional epoxy resins, methylene diphenyl diisocyanate (MDI), toluene diisocyanate (TDI), isophorone diisocyanate (IPDI), and hexamethylene diisocyanate (HDI).

In embodiments of the disclosed methods and compositions, the polysulfide rubber curing agent comprises disulfiram.

The compositions and methods described herein also comprise a liquid carrier. Suitable liquid carriers are $C_1$-$C_3$ alcohols, ketones, aromatic hydrocarbons, fluorocarbons, hydrofluorocarbons, fluoroketones, hydrofluoroketones, and mixtures thereof.

In an embodiment, the liquid carrier has a boiling point of from about 0° C. to about 150° C. In another embodiment, the liquid carrier has a boiling point of from about 30° C. to about 100° C. In still another embodiment, the liquid carrier has a boiling point of from about 30° C. to about 70° C., or from about 30° C. to about 50° C., or from about 40° C. to about 60° C.

The liquid carrier may be a single compound or a mixture of compounds. The liquid carrier is typically at least about 85% of the composition by weight, the balance being the other component. In certain embodiments, the liquid carrier is from about 90-99%, or 91-97%, or 94-96%, or 95-97%, or 96-99%, of the composition by weight. In other embodiments, the liquid carrier is about 90%, 91%, 92%, 93%, 94%, 95%, 96%, 97%, 98%, or 99%, of the composition by weight.

Suitable $C_1$-$C_3$ alcohols for use in the liquid carrier are methanol, ethanol, and n- or isopropanol.

Suitable ketones for use in the liquid carrier include compounds of the formula RC(O)R', where R and R' independently represent lower alkyl groups. Representative ketones include acetone, methyl ethyl ketone, 2-pentanone, and methyl isobutyl ketone.

Representative aromatic hydrocarbons for use in the liquid carrier are benzene, toluene, and ethylbenzene.

Representative suitable fluorocarbons for use alone as the liquid carrier or in combination with another liquid carrier are hexafluorobenzene, octafluorotoluene, perfluoroethylbenzene, octafluorocyclobutane, perfluoropentane, perfluorohexane, perfluorooctane, perfluoro(methylcyclohexane), and perfluorononane.

Representative suitable hydrofluorocarbons are 1-fluorobutane, 2-fluorobutane, 1-fluoropentane, 2-fluoropentane, 1-fluoro-2-methylbutane, 1-fluoro-3-methylbutane, 2-fluoro-2-methylbutane, 1,1-difluoropentane, 2,4-difluoropentane, 1,1,1-trifluoropentane, and 1,5-difluoropentane.

Representative fluoroketones and hydrofluoroketones for use alone as the liquid carrier or in combination with another liquid carrier are 1,1,1,2,2,4,5,5,5-nonafluoro-4-(trifluoromethyl)pentan-3-one (also named perfluoro(2-methyl-3-pentanone and dodecafluoro-2-methylpentan-3-one), 1,1,1-trifluoro-2,4-pentanedione, 1,1,1,2,4,5,5,5-octafluoro-2-(heptafluoropropoxy)-4-(trifluoromethyl)-3-pentanone, 1H,1H,1H-nonafluoro-2-hexanone, perfluoro-2-hexanone, and 1-chloroperfluoro-2-hexanone. In one embodiment, the liquid carrier comprises 1,1,1,2,2,4,5,5,5-nonafluoro-4-(trifluoromethyl)pentan-3-one, which is commercially available as a fire protection fluid from 3MTM as Novec™ 1230.

Fluorinated ketones may be prepared by various methods known in the art. For example, fluorinated ketones of the formula $R_fCF_2C(O)CFXY$, where $R_f$ is F or $C_1$-$C_5$ fluoroalkyl, X is F or Cl, and Y is F, Cl, or $R_f$, can be prepared via isomerization of an appropriately substituted epoxide in the presence of a Lewis acid catalyst, such as $AlF_nCl_{3-n}$, wherein n is from 0.05 to 2.95. See U.S. Pat. No. 5,457,238, the disclosure of which is incorporated herein in its entirety.

The reader will appreciate that flammable solvents are not preferred because of safety and environmental concerns, and that avoiding the use of such liquids is desirable. Thus, in certain embodiments, the compositions and methods described herein are free of flammable solvents. However, in other embodiments, small amounts (e.g., about 1%, 2%, 3%, 4%, or 5%) by weight) of one or more flammable solvents, e.g., methanol, ethanol, methyl isobutyl ketone, or toluene, are present.

The compositions and methods disclosed herein employ one or more ionic liquids. Without wishing to be bound by theory, it is believed that the ionic liquids improve the solubility of the polysulfide rubber curing agent in the liquid carrier, i.e., that they function as surfactants in these systems.

In one embodiment, the ionic liquid is a single compound, i.e., a single ionic liquid. In another embodiment, the ionic liquid comprises a mixture of ionic liquids.

As used herein, the term "ionic liquid" refers to salts with melting points below about 175° C. The ions, i.e., anions and cations, in ionic liquids are understood to be poorly coordinated, resulting in the salts being in the liquid form at relatively low temperatures. Certain ionic liquids are liquids at ambient temperature and are called room temperature ionic liquids (RTILs). In certain embodiments of the methods and compositions disclosed herein, the ionic liquid has a melting point below about 100° C., or below about 75° C., or below about 25° C., or below about 15° C., or below about 0° C.

The ionic liquid is used in an amount effective to increase the solubility of a predetermined amount of polysulfide curing agent in the liquid carrier. The amount of the ionic liquid in the compositions disclosed herein is from about 0.001% to about 2% by weight based on the weight of the composition, or from about 0.001% to about 1% by weight based on the weight of the composition, or from about 0.02% to about 0.1% by weight based on the weight of the composition, or from about 0.1% to about 1% by weight based on the weight of the composition, or from about 0.001% to about 0.5% by weight based on the weight of the composition, or from about 0.001% to about 0.05% by weight based on the weight of the composition.

In one embodiment, the ionic liquid has a melting point of from about −80° C. to about 200° C. In another embodiment, the ionic liquid has a melting point of from about −80° C. to about 25° C.

Suitable ionic liquids include the following classes of ionic liquids:
1,2,3-triazolium ionic liquids;
Thiazolium ionic liquids;
Benzothiazolium ionic liquids;
Glycoside-based ionic liquids; and
Ionic liquids from (meth)acrylic compounds.

In an embodiment, suitable ionic liquids for use in the methods and compositions disclosed herein comprise an anion selected from the group consisting of sulfates, alkylsulfates, arylsulfates, alkylsulfonates, fluorinated alkylsulfates, fluorinated alkylsulfonates, fluoroalkylsulfonylimides, hexafluorophosphate, tetrafluoroborate, thiocyanate, thiosalicylate, dicyanamide, and halides.

Examples of fluorinated alkylsulfonates are triflate, i.e., trifluoromethane sulfonate, and a copolymer of tetrafluoroethylene and $CF_2=CF-O-(CF_2)_2-SO_3-$, commercially available from Solvay as Aquivion® PW79S, and 3,3,4,4,5,5,6,6,7,7,8,8,8-tridecafluorooctane-1-sulfonate, commercially available from DuPont as Zonyl® FS-62.

An example of a fluoroalkylsulfonylimides is triflimide, i.e., (bis(trifluoromethyl-sulfonyl)imide).

In another embodiment, suitable ionic liquids for use in the methods and compositions disclosed herein comprise a cation selected from the group consisting of imidazolium groups, pyridinium groups, pyrrolidinium groups, phosphonium groups, ammonium groups, 1,2,3-triazolium groups, benzothiazolium groups, trichloroaluminate, and sulfonium groups.

In still another embodiment, the ionic liquid comprises
an anion selected from the group consisting of sulfates, alkylsulfates, arylsulfates, alkylsulfonates, fluorinated alkylsulfates, fluorinated alkylsulfonates, fluoroalkylsulfonylimides, hexafluorophosphate, tetrafluoroborate, thiocyanate, thiosalicylate, dicyanamide, halides, and mixtures thereof, and
a cation selected from the group consisting of imidazolium groups, pyridinium groups, pyrrolidinium groups, phosphonium groups, ammonium groups, 1,2,3-triazolium groups, benzothiazolium groups, trichloroaluminate, sulfonium groups, and mixtures thereof.

The ionic liquid may alternatively be an amphoteric compound, e.g., 4-(3-Butyl-1-imidazolio)-1-butanesulfonate, and may be used alone or in combination with the ionic liquids described above that include an anion and a cation.

Representative examples of suitable ionic liquid are:
1,2,3-Trimethylimidazolium methyl sulfate;
1,2,3-Trimethylimidazolium trifluoromethanesulfonate;
1,2-Dimethyl-3-propylimidazolium bis(trifluoromethylsulfonyl)imide;
1,2-Dimethyl-3-propylimidazolium tris(trifluoromethylsulfonyl)methide;
1,3-Dimethylimidazolium methyl sulfate;
1-Allyl-3-methylimidazolium chloride;
1-Benzyl-3-methylimidazolium chloride;
1-Benzyl-3-methylimidazolium hexafluorophosphate;
1-Benzyl-3-methylimidazolium tetrafluoroborate;
1-Butyl-1-(3,3,4,4,5,5,6,6,7,7,8,8,8-tridecafluorooctyl)imidazolium hexafluorophosphate;
1-Butyl-1-methylpyrrolidinium bis(trifluoromethylsulfonyl)imide
1-Butyl-1-methylpyrrolidinium bromide;
1-Butyl-1-methylpyrrolidinium chloride;
1-Butyl-1-methylpyrrolidinium dicyanamide;
1-Butyl-1-methylpyrrolidinium tetrafluoroborate;
1-Butyl-2,3-dimethylimidazolium chloride;
1-Butyl-2,3-dimethylimidazolium hexafluorophosphate;
1-Butyl-2,3-dimethylimidazolium tetrafluoroborate;
1-Butyl-3-methylimidazolium 2-(2-methoxyethoxy)ethyl sulfate;
1-Butyl-3-methylimidazolium acetate;
1-Butyl-3-methylimidazolium bis(trifluoromethylsulfonyl)imide;
1-Butyl-3-methylimidazolium bromide;
1-Butyl-3-methylimidazolium chloride;
1-Butyl-3-methylimidazolium dicyanamide;
1-Butyl-3-methylimidazolium hexafluoroantimonate;
1-Butyl-3-methylimidazolium hexafluorophosphate
1-Butyl-3-methylimidazolium hydrogen sulfate;
1-Butyl-3-methylimidazolium methanesulfonate;
1-Butyl-3-methylimidazolium methyl sulfate;
1-Butyl-3-methylimidazolium nitrate;
1-Butyl-3-methylimidazolium octyl sulfate;
1-Butyl-3-methylimidazolium tetrachloroaluminate;
1-Butyl-3-methylimidazolium tetrafluoroborate;
1-Butyl-3-methylimidazolium thiocyanate;
1-Butyl-3-methylimidazolium tosylate;
1-Butyl-3-methylimidazolium trifluoromethanesulfonate;
1-Butyl-3-methylpyridinium bis(trifluoromethylsulfonyl)imide
1-Butyl-4-methylpyridinium bromide;
1-Butyl-4-methylpyridinium chloride;
1-Butyl-4-methylpyridinium hexafluorophosphate;
1-Butyl-4-methylpyridinium tetrafluoroborate;
1-Butylpyridinium bromide;
1-(3-Cyanopropyl)-3-methylimidazolium bis(trifluoromethylsulfonyl)amide;
1-(3-Cyanopropyl)-3-methylimidazolium chloride;
1-Dodecyl-3-methylimidazolium iodide;
1-Ethyl-2,3-dimethylimidazolium chloride;
1-Ethyl-2,3-dimethylimidazolium ethyl sulfate;

1-Ethyl-2,3-dimethylimidazolium trifluoromethanesulfonate;
1-Ethyl-3-methylimidazolium acetate;
1-Ethyl-3-methylimidazolium bis(pentafluoroethylsulfonyl)imide;
1-Ethyl-3-methylimidazolium bis(trifluoromethylsulfonyl)imide;
1-Ethyl-3-methylimidazolium bromide;
1-Ethyl-3-methylimidazolium chloride;
1-Ethyl-3-methylimidazolium dicyanamide;
1-Ethyl-3-methylimidazolium ethyl sulfate;
1-Ethyl-3-methylimidazolium hexafluorophosphate
1-Ethyl-3-methylimidazolium hydrogen sulfate;
1-Ethyl-3-methylimidazolium methanesulfonate;
1-Ethyl-3-methylimidazolium methyl sulfate;
1-Ethyl-3-methylimidazolium nitrate;
1-Ethyl-3-methylimidazolium tetrachloroaluminate;
1-Ethyl-3-methylimidazolium tetrafluoroborate;
1-Ethyl-3-methylimidazolium thiocyanate;
1-Ethyl-3-methylimidazolium tosylate;
1-Ethyl-3-methylimidazolium trifluoromethanesulfonate;
1-Ethyl-3-methylimidazolium 1,1,2,2-tetrafluoroethanesulfonate;
1-Hexyl-3-methylimidazolium chloride;
1-Hexyl-3-methylimidazolium hexafluorophosphate;
1-Hexyl-3-methylimidazolium tetrafluoroborate;
1-Hexyl-3-methylimidazolium trifluoromethanesulfonate;
1-Hexyl-3-methylimidazolium trifluoromethanesulfonate;
1-Methyl-3-(3,3,4,4,5,5,6,6,7,7,8,8,8-tridecafluorooctyl)imidazolium hexafluorophosphate; 1-Methyl-3-octylimidazolium chloride; 1-Methyl-3-octylimidazolium hexafluorophosphate; 1-Methyl-3-octylimidazolium tetrafluoroborate; 1-Methyl-3-octylimidazolium trifluoromethanesulfonate; 1-Methylimidazolium chloride; 1-Methylimidazolium hydrogen sulfate; 3-(Triphenylphosphonio)propane-1-sulfonate; 3-(Triphenylphosphonio)propane-1-sulfonic acid tosylate; 3-Methyl-1-propylpyridinium bis(trifluoromethylsulfonyl)imide; 4-(3-Butyl-1-imidazolio)-1-butanesulfonate; 4-(3-Butyl-1-imidazolio)-1-butanesulfonic acid triflate;
Methyl-trioctylammonium bis(trifluoromethylsulfonyl)imide;
Tetrabutylammonium benzoate;
Tetrabutylammonium bis(trifluoromethylsulfonyl)imide;
Tetrabutylammonium bromide;
Tetrabutylammonium chloride;
Tetrabutylammonium heptadecafluorooctanesulfonate
Tetrabutylammonium methanesulfonate;
Tetrabutylammonium nonafluorobutanesulfonate;
Tetrabutylphosphonium bromide;
Tetrabutylphosphonium chloride;
Tetrabutylphosphonium methanesulfonate;
Tetrabutylphosphonium p-toluenesulfonate;
Tetrabutylphosphonium tetrafluoroborate;
Tetraethylammonium trifluoroacetate;
Tetraethylammonium trifluoromethanesulfonate;
Tetraheptylammonium bromide;
Tetraheptylammonium chloride;
Tetrahexylammonium bromide;
Tetrahexylammonium iodide;
Tetrahexylammonium tetrafluoroborate;
Tetraoctylammonium bromide;
Tetraoctylammonium chloride;
Tetrapentylammonium bromide;
Tetrapentylammonium thiocyanate;
Tributylhexadecylphosphonium bromide;
Tributylmethylphosphonium methyl sulfate;
Triethylsulfonium bis(trifluoromethylsulfonyl)imide
Trihexyltetradecylphosphonium bis(2,4,4-trimethylpentyl)phosphinate;
Trihexyltetradecylphosphonium bis(trifluoromethylsulfonyl)amide;
Trihexyltetradecylphosphonium bromide;
Trihexyltetradecylphosphonium chloride;
Trihexyltetradecylphosphonium decanoate;
Trihexyltetradecylphosphonium dicyanamide;
Trihexyltetradecylphosphonium hexafluorophosphate;
Trihexyltetradecylphosphonium tetrafluoroborate;
Triisobutylmethylphosphonium tosylate;
Trioctylmethylammonium thiosalicylate;
α-Cyano-4-hydroxycinnamic acid butylamine salt;
α-Cyano-4-hydroxycinnamic acid diethylamine salt;

Other suitable ionic liquids are describe in Ionic Liquids—Classes And Properties, Handy ed., 2001, In Tech, Rijeka, Croatia, the disclosure of which is incorporated herein in its entirety.

Still other ionic liquids are disclosed in U.S. Patent Application Publication No. 20040077519A1, the disclosure of which is incorporated herein in its entirety.

In certain embodiments, the ionic liquid has a melting point temperature that is about the same as or lower than the boiling point of the liquid carrier. In other embodiments, the ionic liquid has a melting point temperature that at least about 10° C. lower than the boiling point of the liquid carrier, or at least about 25° C. lower than the boiling point of the liquid carrier, or at least about 50° C. lower than the boiling point of the liquid carrier.

In certain embodiments, the compositions disclosed herein may include a small amount, i.e., up to about 10% by weight, of water. In certain embodiments, the amount of water in the composition is from about 0.01 to about 1% by weight, or from about 1 to about 2% by weight, or from about 1 to about 3% by weight, or from about 2 to about 4% by weight, or from about 3 to about 5% by weight, or from about 0.01 to about 6% by weight, or from about 5 to about 7% by weight, or from about 6 to about 8% by weight, or from about 7 to about 9% by weight, or from about 8 to about 10% by weight.

When water is to be incorporated in a composition, it may be added together with another component of the composition, or separately. For example, alcohols such as methanol, ethanol, and isopropanol are commercially available not only in their anhydrous form but as aqueous solutions of the alcohol and water. In addition, metal salts such as magnesium acetate are available as hydrates, e.g., magnesium acetate tetrahydrate. Thus, in a non-limiting embodiment, water may be added to the compositions of this disclosure by using 70% aqueous isopropanol and magnesium acetate tetrahydrate.

In certain embodiments, the compositions disclosed herein comprise a compound capable of dissolving, or enhancing dissolution of, the ionic liquid in the liquid carrier. Suitable compounds include surfactants, including fluorinated surfactants. In particular embodiments, the surfactant is an anionic surfactant, a cationic surfactant, or an amphoteric compound. In certain embodiments, these compounds can be used to avoid heating to melt the ionic liquid prior to combining it with the liquid carrier, such as where the ionic liquid has a melting point above the boiling point of the liquid carrier.

In certain embodiments, the composition is a solution at temperatures of about 0° C. to about 35° C. In other embodiments, the composition is a solution at temperatures of about 15° C. to about 35° C., or about 15° C. to about 25° C.

In certain embodiments, the composition is a liquid at temperatures of from about 15° C. to about 35° C., or about 20° C. to about 25° C.

In an embodiment, the composition comprises a liquid carrier, an ionic liquid, $Mg^{2+}$, and disulfiram.

In another embodiment, the composition comprises a liquid carrier, an ionic liquid comprising a cation which is 1-ethyl-3-methylimidazolium and an anion selected from bis(trifluoromethylsulfonylilmide and 1,1,2,2-tetrafluoroethanesulfonate, $Mg^{2+}$, and disulfiram.

In another embodiment, the composition comprises a liquid carrier comprising 1,1,1,2,2,4,5,5,5-nonafluoro-4-(trifluoromethyl)pentan-3-one, an ionic liquid comprising a cation which is 1-ethyl-3-methylimidazolium and an anion selected from bis(trifluoromethylsulfonylilmide and 1,1,2,2-tetrafluoroethanesulfonate, $Mg^{2+}$, and disulfiram.

In another embodiment, the composition comprises
a liquid carrier comprising 1,1,1,2,2,4,5,5,5-nonafluoro-4-(trifluoromethyl)pentan-3-one;
an ionic liquid comprising a cation which is 1-ethyl-3-methylimidazolium and an anion selected from bis (trifluoromethylsulfonylilmide and 1,1,2,2-tetrafluoroethanesulfonate;
$Mg^{2+}$ provided by magnesium acetate; and
a polysulfide curing agent.

In another embodiment, the composition comprises
a liquid carrier comprising 1,1,1,2,2,4,5,5,5-nonafluoro-4-(trifluoromethyl)pentan-3-one;
an ionic liquid comprising a cation which is 1-ethyl-3-methylimidazolium and an anion selected from bis (trifluoromethylsulfonylilmide and 1,1,2,2-tetrafluoroethanesulfonate;
$Mg^{2+}$ provided by magnesium acetate; and disulfiram.

In another embodiment, the composition comprises a liquid carrier comprising 1,1,1,2,2,4,5,5,5-nonafluoro-4-(trifluoromethyl)pentan-3-one, an ionic liquid, $Mg^{2+}$, and disulfiram.

In another embodiment, the composition comprises a liquid carrier comprising 1,1,1,2,2,4,5,5,5-nonafluoro-4-(trifluoromethyl)pentan-3-one, an ionic liquid, $Mg^{2+}$ provided by magnesium acetate, and disulfiram.

The compositions disclosed herein can be made in several ways. For example, in one embodiment, the ionic liquid are first combined with the liquid carrier to form a solution, after which the polysulfide curing agent and metal cation components are added to the solution and mixed until the polysulfide curing agent and metal cation components are dissolved. In certain embodiments, melting the ionic liquid and/or the polysulfide curing agent may be used to increase the rate of dissolution in the ionic liquid/liquid carrier. Also, the ionic liquid may be melted prior to combination with the liquid carrier.

In another embodiment, the polysulfide curing agent and metal cation are added to the liquid carrier to form a mixture, after which the ionic liquid is added and the resulting mixture agitated until a solution is formed. In certain embodiments, melting the ionic liquid and/or the polysulfide curing agent may be used to increase the rate of dissolution in the liquid carrier. Further, the ionic liquid may be melted prior to combination with the mixture of liquid carrier, polysulfide curing agent, and metal cation.

In another embodiment, the disclosure provides a method for sealing gaps between adjoining or connected solid surfaces on an aircraft, comprising applying a polysulfide rubber to the gap to form an uncured seal over the gap, and contacting the uncured seal with a composition comprising a polysulfide rubber curing agent, a metal cation, an ionic liquid, and a liquid carrier.

In another embodiment (Embodiment E1), the disclosure provides a method of curing a surface of an uncured polysulfide rubber, the method comprising contacting an uncured polysulfide rubber with a composition comprising a polysulfide rubber curing agent, a metal cation, an ionic liquid, and a liquid carrier.

In another embodiment (Embodiment E2), the disclosure provides a method according to Embodiment E1, wherein the metal cation is $Zn^{2+}$, $Pb^{2+}$, $Pb^{4+}$, $Fe^{2+}$, $Ca^{2+}$, $Sb^{2+}$, $Sb^{5+}$, $As^{3+}$, $As^{5+}$, $Ba^{2+}$, $Mn^{4+}$, $Cr^{3+}$, $Cu^{2+}$, $Co^{2+}$, $Mg^{2+}$, $Se^{4+}$, or $Te^{4+}$.

In another embodiment (Embodiment E3), the disclosure provides a method according to Embodiment E1 or Embodiment E2, wherein the metal cation is $Mg^{2+}$.

In another embodiment (Embodiment E4), the disclosure provides a method according to any of Embodiments E1-E3, wherein the polysulfide rubber curing agent is a metal oxide, a metallic peroxide, an inorganic oxidizing agent, an organic oxidizing agent, a quinoid compound, a sulfur-containing compound, or mixture thereof.

In another embodiment (Embodiment E5), the disclosure provides a method according to any of Embodiments E1-E4, wherein the polysulfide rubber curing agent is ZnO, PbO, FeO, CaO, $Sb_2O_3$, $Sb_2O_5$, $As_2O_3$, $As_2O_5$, BaO, $Cr_2O_3$, CuO, CoO, $Pb_3O_4$, MgO, $ZnO_2$, $PbO_2$, $CaO_2$, $MgO_2$, $SeO_2$, $TeO_2$, $BaO_2$, $NaBO_3 \cdot 4H_2O$, $MnO_2$, $ZnCrO_4$, $PbCrO_4$, $K_2CrO_4$, $(NH_4)_2Cr_2O_7$, $Na_2CrO_4$, urea peroxide, t-butyl hydroperoxide, t-butyl perbenzoate, di nitrobenzene, trinitrobenzene, benzoyl peroxide, cumene hydroperoxide, stearoyl peroxide, lauroyl peroxide, methyl ethyl ketone peroxide, p-quinone dioxime, dimethylglyoxime, quinone, benzothiazyl disulfide, disulfiram, dinitrobenzene salt of mercaptobenzothiazole, mercaptobenzothiazole, or a mixture thereof.

In another embodiment (Embodiment E6), the disclosure provides a method according to any of Embodiments E1-E5, wherein the liquid carrier comprises a $C_1$-$C_3$ alcohol, a fluorocarbon, a hydrofluorocarbon, a fluoroketone, or a mixture thereof.

In another embodiment (Embodiment E7), the disclosure provides a method according to any of Embodiments E1-E6, wherein the liquid carrier comprises methanol, ethanol, 1,1,1,2,2,4,5,5,5-nonafluoro-4-(trifluoromethyl)pentan-3-one, or a mixture thereof.

In another embodiment (Embodiment E8), the disclosure provides a method according to any of Embodiments E1-E7, wherein the composition comprises a mixture of ionic liquids.

In another embodiment (Embodiment E9), the disclosure provides method according to any of Embodiments E1-E8, wherein the ionic liquid has a melting point of from about −80° C. to about 200° C.

In another embodiment (Embodiment E10), the disclosure provides a method according to any of Embodiments E1-E9, wherein the ionic liquid has a melting point of from about −80° C. to about 25° C.

In another embodiment (Embodiment E11), the disclosure provides a method according to any of Embodiments E1-E10, wherein the ionic liquid comprises an anion selected from the group consisting of sulfates, alkylsulfates, arylsulfates, alkylsulfonates, fluorinated alkylsulfates, fluorinated alkylsulfonates, fluoroalkylsulfonylimides, hexafluorophosphate, tetrafluoroborate, thiocyanate, thiosalicylate, dicyanamide, and halides.

In another embodiment (Embodiment E12), the disclosure provides a method according to any of Embodiments E1-E11, wherein the ionic liquid comprises a cation selected from the group consisting of imidazolium groups, pyridinium groups, pyrrolidinium groups, phosphonium groups, ammonium groups, 1,2,3-triazolium groups, benzothiazolium groups, trichloroaluminate, and sulfonium groups.

In another embodiment (Embodiment E13), the disclosure provides a method according to any of Embodiments E1-E10, wherein the ionic liquid is an amphoteric compound.

In another embodiment (Embodiment E14), the disclosure provides a method according to Embodiment E1, wherein the ionic liquid is 1,2,3-Trimethylimidazolium methyl sulfate;
1,2,3-Trimethylimidazolium trifluoromethanesulfonate;
1,2-Dimethyl-3-propylimidazolium bis(trifluoromethylsulfonyl)imide;
1,2-Dimethyl-3-propylimidazolium tris(trifluoromethylsulfonyl)methide;
1,3-Dimethylimidazolium methyl sulfate;
1-Allyl-3-methylimidazolium chloride;
1-Benzyl-3-methylimidazolium chloride;
1-Benzyl-3-methylimidazolium hexafluorophosphate;
1-Benzyl-3-methylimidazolium tetrafluoroborate;
1-Butyl-1-(3,3,4,4,5,5,6,6,7,7,8,8,8-tridecafluorooctyl)imidazolium hexafluorophosphate;
1-Butyl-l-methylpyrrolidinium bis(trifluoromethylsulfonyl)imide
1-Butyl-l-methylpyrrolidinium bromide;
1-Butyl-l-methylpyrrolidinium chloride;
1-Butyl-l-methylpyrrolidinium dicyanamide;
1-Butyl-1-methylpyrrolidinium tetrafluoroborate;
1-Butyl-2,3-dimethylimidazolium chloride;
1-Butyl-2,3-dimethylimidazolium hexafluorophosphate;
1-Butyl-2,3-dimethylimidazolium tetrafluoroborate;
1-Butyl-3-methylimidazolium 2-(2-methoxyethoxy)ethyl sulfate;
1-Butyl-3-methylimidazolium acetate;
1-Butyl-3-methylimidazolium bis(trifluoromethylsulfonyl)imide;
1-Butyl-3-methylimidazolium bromide;
1-Butyl-3-methylimidazolium chloride;
1-Butyl-3-methylimidazolium dicyanamide;
1-Butyl-3-methylimidazolium hexafluoroantimonate;
1-Butyl-3-methylimidazolium hexafluorophosphate
1-Butyl-3-methylimidazolium hydrogen sulfate;
1-Butyl-3-methylimidazolium methanesulfonate;
1-Butyl-3-methylimidazolium methyl sulfate;
1-Butyl-3-methylimidazolium nitrate;
1-Butyl-3-methylimidazolium octyl sulfate;
1-Butyl-3-methylimidazolium tetrachloroaluminate;
1-Butyl-3-methylimidazolium tetrafluoroborate;
1-Butyl-3-methylimidazolium thiocyanate;
1-Butyl-3-methylimidazolium tosylate;
1-Butyl-3-methylimidazolium trifluoromethanesulfonate;
1-Butyl-3-methylpyridinium bis(trifluoromethylsulfonyl)imide
1-Butyl-4-methylpyridinium bromide;
1-Butyl-4-methylpyridinium chloride;
1-Butyl-4-methylpyridinium hexafluorophosphate;
1-Butyl-4-methylpyridinium tetrafluoroborate;
1-Butylpyridinium bromide;
1-(3-Cyanopropyl)-3-methylimidazolium bis(trifluoromethylsulfonyl)amide;
1-(3-Cyanopropyl)-3-methylimidazolium chloride;
1-Dodecyl-3-methylimidazolium iodide;
1-Ethyl-2,3-dimethylimidazolium chloride;
1-Ethyl-2,3-dimethylimidazolium ethyl sulfate;
1-Ethyl-2,3-dimethylimidazolium trifluoromethanesulfonate;
1-Ethyl-3-methylimidazolium acetate;
1-Ethyl-3-methylimidazolium bis(pentafluoroethylsulfonyl)Imide;
1-Ethyl-3-methylimidazolium bis(trifluoromethylsulfonyl)Imide;
1-Ethyl-3-methylimidazolium bromide;
1-Ethyl-3-methylimidazolium chloride;
1-Ethyl-3-methylimidazolium dicyanamide;
1-Ethyl-3-methylimidazolium ethyl sulfate;
1-Ethyl-3-methylimidazolium hexafluorophosphate
1-Ethyl-3-methylimidazolium hydrogen sulfate;
1-Ethyl-3-methylimidazolium methanesulfonate;
1-Ethyl-3-methylimidazolium methyl sulfate;
1-Ethyl-3-methylimidazolium nitrate;
1-Ethyl-3-methylimidazolium tetrachloroaluminate;
1-Ethyl-3-methylimidazolium tetrafluoroborate;
1-Ethyl-3-methylimidazolium thiocyanate;
1-Ethyl-3-methylimidazolium tosylate;
1-Ethyl-3-methylimidazolium trifluoromethanesulfonate;
1-Ethyl-3-methylimidazolium 1,1,2,2-tetrafluoroethanesulfonate;
1-Hexyl-3-methylimidazolium chloride;
1-Hexyl-3-methylimidazolium hexafluorophosphate;
1-Hexyl-3-methylimidazolium tetrafluoroborate;
1-Hexyl-3-methylimidazolium trifluoromethanesulfonate;
1-Hexyl-3-methylimidazolium trifluoromethanesulfonate;
1-Methyl-3-(3,3,4,4,5,5,6,6,7,7,8,8,8-tridecafluorooctyl)imidazolium hexafluorophosphate;
1-Methyl-3-octylimidazolium chloride;
1-Methyl-3-octylimidazolium hexafluorophosphate;
1-Methyl-3-octylimidazolium tetrafluoroborate;
1-Methyl-3-octylimidazolium trifluoromethanesulfonate;
1-Methylimidazolium chloride;
1-Methylimidazolium hydrogen sulfate;
3-(Triphenylphosphonio)propane-1-sulfonate;
3-(Triphenylphosphonio)propane-1-sulfonic acid tosylate;
3-Methyl-1-propylpyridinium bis(trifluoromethylsulfonyl)imide;
4-(3-Butyl-1-imidazolio)-1-butanesulfonate;
4-(3-Butyl-1-imidazolio)-1-butanesulfonic acid triflate;
Methyl-trioctylammonium bis(trifluoromethylsulfonyl)imide;
Tetrabutylammonium benzoate;
Tetrabutylammonium bis(trifluoromethylsulfonyl)imide;
Tetrabutylammonium bromide;
Tetrabutylammonium chloride;
Tetrabutylammonium heptadecafluorooctanesulfonate
Tetrabutylammonium methanesulfonate;
Tetrabutylammonium nonafluorobutanesulfonate;
Tetrabutylphosphonium bromide;
Tetrabutylphosphonium chloride;
Tetrabutylphosphonium methanesulfonate;
Tetrabutylphosphonium p-toluenesulfonate;
Tetrabutylphosphonium tetrafluoroborate;
Tetraethylammonium trifluoroacetate;
Tetraethylammonium trifluoromethanesulfonate;
Tetraheptylammonium bromide;
Tetraheptylammonium chloride;
Tetrahexylammonium bromide;
Tetrahexylammonium iodide;
Tetrahexylammonium tetrafluoroborate;
Tetraoctylammonium bromide;
Tetraoctylammonium chloride;

Tetrapentylammonium bromide;
Tetrapentylammonium thiocyanate;
Tributylhexadecylphosphonium bromide;
Tributylmethylammonium methyl sulfate;
Triethylsulfonium bis(trifluoromethylsulfonyl)imide
Trihexyltetradecylphosphonium bis(2,4,4-trimethylpentyl) phosphinate;
Trihexyltetradecylphosphonium bis(trifluoromethylsulfonyl)amide;
Trihexyltetradecylphosphonium bromide;
Trihexyltetradecylphosphonium chloride;
Trihexyltetradecylphosphonium decanoate;
Trihexyltetradecylphosphonium dicyanamide;
Trihexyltetradecylphosphonium hexafluorophosphate;
Trihexyltetradecylphosphonium tetrafluoroborate;
Triisobutylmethylphosphonium tosylate;
Trioctylmethylammonium thiosalicylate;
α-Cyano-4-hydroxycinnamic acid butylamine salt;
α-Cyano-4-hydroxycinnamic acid diethylamine salt;

In another embodiment (Embodiment E15), the disclosure provides a method according to any of Embodiments E1-E14, wherein the polysulfide rubber is a poly(ethylene disulfide); poly(ethylene tetrasulfide); poly(ethyl ether disulfide); poly(ethyl ether tetrasulfide); poly(ethyl formal disulfide); poly(pentamethylene disulfide); poly(hexamethylene disulfide); poly(butyl formal disulfide); or poly(butyl ether disulfide).

In another embodiment (Embodiment E16), the disclosure provides a method according to any of Embodiments E1-E15, wherein the polysulfide rubber is a copolymer of a dihalogenated alkyl- or alkyl ether monomer, a trihaloalkyl, monomer, and sodium disulfide, sodium trisulfide, or sodium tetrasulfide.

In another embodiment (Embodiment E17), the disclosure provides a method for sealing a gaps between adjoining or connected solid surfaces on an aircraft, comprising applying a polysulfide rubber to the gap to form an uncured seal over the gap, and contacting the uncured seal with a composition comprising a polysulfide rubber curing agent, a metal cation, an ionic liquid, and a liquid carrier.

In another embodiment (Embodiment E18), the disclosure provides a composition comprising a liquid carrier, a polysulfide rubber curing agent, a metal cation, and an ionic liquid.

In another embodiment (Embodiment E19), the disclosure provides a composition according to Embodiment E18, wherein the liquid carrier has a boiling point of about from about 30° C. to about 50° C.

In another embodiment (Embodiment E20), the disclosure provides a composition according to Embodiments E18 or E19, wherein the polysulfide rubber curing agent is disulfiram.

In another embodiment (Embodiment E21), the disclosure provides a composition according to any of Embodiments E18-E20, wherein the amount of the ionic liquid in the composition is from about 0.001% to about 2% by weight based on the weight of the composition.

In another embodiment (Embodiment E22), the disclosure provides a composition according to any of Embodiments E18-E21, wherein the amount of the polysulfide curing agent in the composition is from about 0.05% to about 5% by weight based on the weight of the composition.

In another embodiment (Embodiment E23), the disclosure provides a composition according to any of Embodiments E18-E22, further comprising a compound capable of dissolving the ionic liquid in the liquid carrier.

In another embodiment (Embodiment E24), the disclosure provides a composition according to any of Embodiments E18-E24, wherein the liquid carrier comprises a $C_1$-$O_3$ alcohol, a fluorocarbon, a hydrofluorocarbon, a fluoroketone, or mixture thereof.

In another embodiment (Embodiment E25), the disclosure provides a composition according to any of Embodiments E18-E24, wherein the melting point of the ionic liquid is a temperature lower than the boiling point of the liquid carrier.

In another embodiment (Embodiment E26), the disclosure provides a composition according to any of Embodiments E18-E25, wherein the composition is a solution at temperatures of about 0° C. to about 35° C.

In another embodiment (Embodiment E27), the disclosure provides a composition according to any of Embodiments E18-E26, wherein the liquid carrier comprises 1,1,1,2,2,4,5,5,5-nonafluoro-4-(trifluoromethyl)pentan-3-one.

In another embodiment (Embodiment E28), the disclosure provides a composition according to any of Embodiments E18-E27, wherein the metal cation is $Mg^{2+}$.

In another embodiment (Embodiment E29), the disclosure provides a composition according to any of Embodiments E18-E28, wherein the $Mg^{2+}$ is derived from magnesium acetate.

In another embodiment (Embodiment E30), the disclosure provides a composition according to Embodiment E18, wherein
  the liquid carrier comprises 1,1,1,2,2,4,5,5,5-nonafluoro-4-(trifluoromethyl)pentan-3-one and isopropanol;
  the curing agent comprises disulfiram;
  the metal cation is derived from magnesium acetate, and
  the ionic liquid comprises 1-Butyl-1-(3,3,4,4,5,5,6,6,7,7,8,8,8-tridecafluorooctyl)imidazolium hexafluorophosphate or trihexyltetradecylphosphonium bis(trifluoromethylsulfonyl)amide.

In another embodiment (Embodiment E31), the disclosure provides a composition according to Embodiment E18, wherein
  the liquid carrier comprises 1,1,1,2,2,4,5,5,5-nonafluoro-4-(trifluoromethyl)pentan-3-one and isopropanol;
  the curing agent comprises tent-Butyl peroxybenzoate;
  the metal cation is derived from magnesium acetate, and
  the ionic liquid comprises 1-Butyl-1-(3,3,4,4,5,5,6,6,7,7,8,8,8-tridecafluorooctyl)imidazolium hexafluorophosphate or
  trihexyltetradecylphosphonium bis(trifluoromethylsulfonyl)amide.

In another embodiment (Embodiment E32), the disclosure provides a composition according to Embodiment E18, wherein
  the liquid carrier comprises 1,1,1,2,2,4,5,5,5-nonafluoro-4-(trifluoromethyl)pentan-3-one;
  the curing agent comprises tent-Butyl peroxybenzoate;
  the metal cation is derived from magnesium acetate, and
  the ionic liquid comprises 1-Butyl-1-(3,3,4,4,5,5,6,6,7,7,8,8,8-tridecafluorooctyl)imidazolium hexafluorophosphate or
  trihexyltetradecylphosphonium bis(trifluoromethylsulfonyl)amide.

In another embodiment (Embodiment E33), the disclosure provides a composition according to any one of Embodiments E30-E32, wherein the ionic liquid comprises 1-Butyl-1-(3,3,4,4,5,5,6,6,7,7,8,8,8-tridecafluorooctyl)imidazolium hexafluorophosphate.

In another embodiment (Embodiment E34), the disclosure provides a composition according to any one of Embodiments E30-E32, wherein the ionic liquid comprises trihexyltetradecylphosphonium bis(trifluoromethylsulfonyl)amide.

The following examples illustrate the invention but are not intended to limit the scope of the invention.

EXAMPLES

The compositions in Examples 1-3 are prepared by combining the co-solvent and ionic liquid an Erlenmeyer flask with a magnetic stirring bar. After thorough mixing, the magnesium acetate and the disulfiram or tent-Butyl peroxybenzoate are added to the mixture to form a slurry. The 1,1,1,2,2,4,5,5,5-nonafluoro-4-(trifluoromethyl)pentan-3-one (solvent) is then slowly added to the slurry. The resulting composition is mixed until all the components are fully dissolved, although the final product may appear as an emulsion or a biphasic composition. (Note: when the solvent, e.g., 1,1,1,2,2,4,5,5,5-nonafluoro-4-(trifluoromethyl)pentan-3-one, has a relatively low boiling point, slow addition may be necessary to prevent evaporation.)

Example 1

| Material | Grams used | Weight % |
| --- | --- | --- |
| 1,1,1,2,2,4,5,5,5-nonafluoro-4-(trifluoromethyl)pentan-3-one (solvent) | 25.000 | 75.00 |
| 70% aq. isopropanol (co-solvent) | 7.317 | 21.95 |
| Disulfiram | 0.833 | 2.50 |
| Magnesium acetate | 0.167 | 0.50 |
| 1-Butyl-1-(3,3,4,4,5,5,6,6,7,7,8,8,8-tridecafluorooctyl)imidazolium hexafluorophosphate (ionic liquid) | 0.017 | 0.05 |

Example 2

| Material | Grams used | Weight % |
| --- | --- | --- |
| 1,1,1,2,2,4,5,5,5-nonafluoro-4-(trifluoromethyl)pentan-3-one (solvent) | 30.000 | 90.00 |
| 70% aq. isopropanol (co-solvent) | 2.327 | 6.98 |
| Disulfiram | 0.867 | 2.60 |
| Magnesium acetate | 0.133 | 0.40 |
| Trihexyltetradecylphosphonium bis(trifluoromethylsulfonyl)amide (ionic liquid) | 0.007 | 0.02 |

Example 3

| Material | Grams used | Weight % |
| --- | --- | --- |
| 1,1,1,2,2,4,5,5,5-nonafluoro-4-(trifluoromethyl)pentan-3-one (solvent) | 28.00 | 84.00 |
| 50% aq. isopropanol (co-solvent) | 4.00 | 12.00 |
| tert-Butyl peroxybenzoate | 0.833 | 2.50 |
| Magnesium acetate | 0.167 | 0.50 |
| 1-Butyl-1-(3,3,4,4,5,5,6,6,7,7,8,8,8-tridecafluorooctyl)imidazolium hexafluorophosphate (ionic liquid) | 0.34 | 1.00 |

Example 4

The following composition is prepared in a flask equipped with a magnetic stirring bar by combining the ionic liquid, the tert-Butyl peroxybenzoate, and the magnesium acetate. To this mixture is then added the solvent, after which the composition is mixed until all the components are fully dissolved, although the final product may appear as an emulsion or a biphasic composition. (Note: when the solvent, e.g., 1,1,1,2,2,4,5,5,5-nonafluoro-4-(trifluoromethyl)pentan-3-one, has a relatively low boiling point, slow addition may be necessary to prevent evaporation.)

| Material | Grams used | Weight % |
| --- | --- | --- |
| 1,1,1,2,2,4,5,5,5-nonafluoro-4-(trifluoromethyl)pentan-3-one (solvent) | 32.00 | 96.00 |
| tert-Butyl peroxybenzoate | 0.95 | 2.85 |
| Magnesium acetate | 0.133 | 0.40 |
| Trihexyltetradecylphosphonium bis(trifluoromethylsulfonyl)amide (ionic liquid) | 0.25 | 0.75 |

Use of compositions of this disclosure result in improved rates of skin formation compared with state of the art technology. Although the overall time for skin variation depends on various environmental factors, e.g., temperature, humidity level, etc., under identical conditions, increases of 50% or more in skinning rate can be achieved using the disclosed compositions. In certain embodiments, the time necessary to form a skin will be reduced by a factor of 2, a factor of 3, a factor of 4, a factor of 6, or a factor of 8 using the methods and compositions disclosed herein when compared with methods and compositions currently in use.

Having described the invention in detail and by reference to specific embodiments thereof, it will be apparent that modifications and variations are possible without departing from the scope of the invention defined in the appended claims. More specifically, although some aspects of the invention are identified herein as particularly advantageous, it is contemplated that the invention is not necessarily limited to these particular aspects of the invention.

What is claimed is:

1. A method of curing a surface of an uncured polysulfide rubber, the method comprising contacting an uncured polysulfide rubber with a composition comprising a polysulfide rubber curing agent, a metal cation, an ionic liquid, and at least about 85% by weight of a liquid carrier based on the weight of the composition, wherein the liquid carrier is a $C_1$-$C_3$ alcohol, fluorocarbon, aromatic hydrocarbon, hydrofluorocarbon, fluoroketone, or mixture thereof.

2. A method according to claim 1, wherein the metal cation is $Zn^{2+}$, $Pb^{2+}$, $Pb^{4+}$, $Fe^{2+}$, $Ca^{2+}$, $Sb^{2+}$, $Sb^{5+}$, $As^{3+}$, $As^{5+}$, $Ba^{2+}$, $Mn^{4+}$, $Cr^{3+}$, $Cu^{2+}$, $Co^{2+}$, $Mg^{2+}$, $Se^{4+}$, or $Te^{4+}$.

3. A method according to claim 1, wherein the metal cation is $Mg^{2+}$.

4. A method according to claim 1, wherein the polysulfide rubber curing agent is a metal oxide, a metallic peroxide, an inorganic oxidizing agent, an organic oxidizing agent, a quinoid compound, a sulfur-containing compound, or mixture thereof.

5. A method according to claim 1, wherein the polysulfide rubber curing agent is ZnO, PbO, FeO, CaO, $Sb_2O_3$, $Sb_2O_5$, $As_2O_3$, $As_2O_5$, BaO, $Cr_2O_3$, CuO, CoO, $Pb_3O_4$, MgO, $ZnO_2$, $PbO_2$, $CaO_2$, $MgO_2$, $SeO_2$, $TeO_2$, $BaO_2$, $NaBO_3 \cdot 4H_2O$, $MnO_2$, $ZnCrO_4$, $PbCrO_4$, $K_2CrO_4$, $(NH_4)_2Cr_2O_7$, $Na_2CrO_4$, urea peroxide, t-butyl hydroperoxide, t-butyl perbenzoate, dinitrobenzene, trinitrobenzene, benzoyl peroxide, cumene hydroperoxide, stearoyl peroxide, lauroyl peroxide, methyl ethyl ketone peroxide, p-quinone dioxime, dimethylglyoxime, quinone, benzothiazyl disulfide, disulfiram, dinitrobenzene salt of mercaptobenzothiazole, mercaptobenzothiazole, or a mixture thereof.

6. A method according to claim 1, wherein the composition comprises a mixture of ionic liquids.

7. A method according to any of claim 1, wherein the ionic liquid has a melting point of from about −80° C. to about 200° C.

8. A method according to claim 1, wherein the ionic liquid is
- 1,2,3-Trimethylimidazolium methyl sulfate;
- 1,2,3-Trimethylimidazolium trifluoromethanesulfonate;
- 1,2-Dimethyl-3-propylimidazolium bis(trifluoromethylsulfonyl)imide;
- 1,2-Dimethyl-3-propylimidazolium tris(trifluoromethylsulfonyl)methide;
- 1,3-Dimethylimidazolium methyl sulfate;
- 1-Allyl-3-methylimidazolium chloride;
- 1-Benzyl-3-methylimidazolium chloride;
- 1-Benzyl-3-methylimidazolium hexafluorophosphate;
- 1-Benzyl-3-methylimidazolium tetrafluoroborate;
- 1-Butyl-1-(3,3,4,4,5,5,6,6,7,7,8,8,8-tridecafluorooctyl) imidazolium hexafluorophosphate;
- 1-Butyl-1-methylpyrrolidinium bis(trifluoromethylsulfonyl)imide;
- 1-Butyl-1-methylpyrrolidinium bromide;
- 1-Butyl-1-methylpyrrolidinium chloride;
- 1-Butyl-1-methylpyrrolidinium dicyanamide;
- 1-Butyl-1-methylpyrrolidinium tetrafluoroborate;
- 1-Butyl-2,3-dimethylimidazolium chloride;
- 1-Butyl-2,3-dimethylimidazolium hexafluorophosphate;
- 1-Butyl-2,3-dimethylimidazolium tetrafluoroborate;
- 1-Butyl-3-methylimidazolium 2-(2-methoxyethoxy)ethyl sulfate;
- 1-Butyl-3-methylimidazolium acetate;
- 1-Butyl-3-methylimidazolium bis(trifluoromethylsulfonyl)imide;
- 1-Butyl-3-methylimidazolium bromide;
- 1-Butyl-3-methylimidazolium chloride;
- 1-Butyl-3-methylimidazolium dicyanamide;
- 1-Butyl-3-methylimidazolium hexafluoroantimonate;
- 1-Butyl-3-methylimidazolium hexafluorophosphate
- 1-Butyl-3-methylimidazolium hydrogen sulfate;
- 1-Butyl-3-methylimidazolium methanesulfonate;
- 1-Butyl-3-methylimidazolium methyl sulfate;
- 1-Butyl-3-methylimidazolium nitrate;
- 1-Butyl-3-methylimidazolium octyl sulfate;
- 1-Butyl-3-methylimidazolium tetrachloroaluminate;
- 1-Butyl-3-methylimidazolium tetrafluoroborate;
- 1-Butyl-3-methylimidazolium thiocyanate;
- 1-Butyl-3-methylimidazolium tosylate;
- 1-Butyl-3-methylimidazolium trifluoromethanesulfonate;
- 1-Butyl-3-methylpyridinium bis(trifluoromethylsulfonyl)imide
- 1-Butyl-4-methylpyridinium bromide;
- 1-Butyl-4-methylpyridinium chloride;
- 1-Butyl-4-methylpyridinium hexafluorophosphate;
- 1-Butyl-4-methylpyridinium tetrafluoroborate;
- 1-Butylpyridinium bromide;
- 1-(3-Cyanopropyl)-3-methylimidazolium bis(trifluoromethylsulfonyl)amide;
- 1-(3-Cyanopropyl)-3-methylimidazolium chloride;
- 1-Dodecyl-3-methylimidazolium iodide;
- 1-Ethyl-2,3-dimethylimidazolium chloride;
- 1-Ethyl-2,3-dimethylimidazolium ethyl sulfate;
- 1-Ethyl-2,3-dimethylimidazolium trifluoromethanesulfonate;
- 1-Ethyl-3-methylimidazolium acetate;
- 1-Ethyl-3-methylimidazolium bis(pentafluoroethylsulfonyl)Imide;
- 1-Ethyl-3-methylimidazolium bis(trifluoromethylsulfonyl)Imide;
- 1-Ethyl-3-methylimidazolium bromide;
- 1-Ethyl-3-methylimidazolium chloride;
- 1-Ethyl-3-methylimidazolium dicyanamide;
- 1-Ethyl-3-methylimidazolium ethyl sulfate;
- 1-Ethyl-3-methylimidazolium hexafluorophosphate
- 1-Ethyl-3-methylimidazolium hydrogen sulfate;
- 1-Ethyl-3-methylimidazolium methanesulfonate;
- 1-Ethyl-3-methylimidazolium methyl sulfate;
- 1-Ethyl-3-methylimidazolium nitrate;
- 1-Ethyl-3-methylimidazolium tetrachloroaluminate;
- 1-Ethyl-3-methylimidazolium tetrafluoroborate;
- 1-Ethyl-3-methylimidazolium thiocyanate;
- 1-Ethyl-3-methylimidazolium tosylate;
- 1-Ethyl-3-methylimidazolium trifluoromethanesulfonate;
- 1-Ethyl-3-methylimidazolium 1,1,2,2-tetrafluoroethanesulfonate;
- 1-Hexyl-3-methylimidazolium chloride;
- 1-Hexyl-3-methylimidazolium hexafluorophosphate;
- 1-Hexyl-3-methylimidazolium tetrafluoroborate;
- 1-Hexyl-3-methylimidazolium trifluoromethanesulfonate;
- 1-Hexyl-3-methylimidazolium trifluoromethanesulfonate;
- 1-Methyl-3-(3,3,4,4,5,5,6,6,7,7,8,8,8-tridecafluorooctyl) imidazolium hexafluorophosphate;
- 1-Methyl-3-octylimidazolium chloride;
- 1-Methyl-3-octylimidazolium hexafluorophosphate;
- 1-Methyl-3-octylimidazolium tetrafluoroborate;
- 1-Methyl-3-octylimidazolium trifluoromethanesulfonate;
- 1-Methylimidazolium chloride;
- 1-Methylimidazolium hydrogen sulfate;
- 3-(Triphenylphosphonio)propane-1-sulfonate;
- 3-(Triphenylphosphonio)propane-1-sulfonic acid tosylate;
- 3-Methyl-1-propylpyridinium bis(trifluoromethylsulfonyl)imide;
- 4-(3-Butyl-1-imidazolio)-1-butanesulfonate;
- 4-(3-Butyl-1-imidazolio)-1-butanesulfonic acid triflate;
- Methyl-trioctylammonium bis(trifluoromethylsulfonyl)imide;
- Tetrabutylammonium benzoate;
- Tetrabutylammonium bis(trifluoromethylsulfonyl)imide;
- Tetrabutylammonium bromide;
- Tetrabutylammonium chloride;
- Tetrabutylammonium heptadecafluorooctanesulfonate
- Tetrabutylammonium methanesulfonate;
- Tetrabutylammonium nonafluorobutanesulfonate;
- Tetrabutylphosphonium bromide;
- Tetrabutylphosphonium chloride;
- Tetrabutylphosphonium methanesulfonate;
- Tetrabutylphosphonium p-toluenesulfonate;
- Tetrabutylphosphonium tetrafluoroborate;
- Tetraethylammonium trifluoroacetate;
- Tetraethylammonium trifluoromethanesulfonate;
- Tetraheptylammonium bromide;
- Tetraheptylammonium chloride;
- Tetrahexylammonium bromide;
- Tetrahexylammonium iodide;
- Tetrahexylammonium tetrafluoroborate;
- Tetraoctylammonium bromide;
- Tetraoctylammonium chloride;
- Tetrapentylammonium bromide;
- Tetrapentylammonium thiocyanate;

Tributylhexadecylphosphonium bromide;
Tributylmethylammonium methyl sulfate;
Triethylsulfonium bis(trifluoromethylsulfonyl)imide
Trihexyltetradecylphosphonium bis(2,4,4-trimethylpentyl)phosphinate;
Trihexyltetradecylphosphonium bis(trifluoromethylsulfonyl)amide;
Trihexyltetradecylphosphonium bromide;
Trihexyltetradecylphosphonium chloride;
Trihexyltetradecylphosphonium decanoate;
Trihexyltetradecylphosphonium dicyanamide;
Trihexyltetradecylphosphonium hexafluorophosphate;
Trihexyltetradecylphosphonium tetrafluoroborate;
Triisobutylmethylphosphonium tosylate;
Trioctylmethylammonium thiosalicylate;
α-Cyano-4-hydroxycinnamic acid butylamine salt; or
α-Cyano-4-hydroxycinnamic acid diethylamine salt.

9. A method according to claim 1, wherein the polysulfide rubber is a poly(ethylene disulfide); poly(ethylene tetrasulfide); poly(ethyl ether disulfide); poly(ethyl ether tetrasulfide); poly(ethyl formal disulfide); poly(pentamethylene disulfide); poly(hexamethylene disulfide); poly(butyl formal disulfide); or poly(butyl ether disulfide).

10. A method for sealing a gaps between adjoining or connected solid surfaces on an aircraft, comprising applying a polysulfide rubber to the gap to form an uncured seal over the gap, and contacting the uncured seal with a composition comprising a polysulfide rubber curing agent, a metal cation, an ionic liquid, and at least about 85% by weight of a liquid carrier based on the weight of the composition, wherein the liquid carrier is a $C_1$-$C_3$ alcohol, fluorocarbon, aromatic hydrocarbon, hydrofluorocarbon, fluoroketone, or mixture thereof.

11. A method according to claim 1, wherein the polysulfide rubber curing agent is disulfiram.

12. A method according to claim 1, wherein the amount of the polysulfide curing agent in the composition is from about 0.05% to about 5% by weight based on the weight of the composition.

13. A method according to claim 1, further comprising a compound capable of dissolving the ionic liquid in the liquid carrier.

14. A method according to claim 3, wherein the $Mg^{2+}$ is derived from magnesium acetate.

15. A method according to claim 1, wherein
the liquid carrier comprises 1,1,1,2,2,4,5,5,5-nonafluoro-4-(trifluoromethyl)pentan-3-one and isopropanol;
the curing agent comprises disulfiram;
the metal cation is derived from magnesium acetate, and
the ionic liquid comprises 1-Butyl-1-(3,3,4,4,5,5,6,6,7,7,8,8,8-tridecafluorooctyl)imidazolium hexafluorophosphate or trihexyltetradecylphosphonium bis(trifluoromethylsulfonyl)amide.

16. A method according to claim 1, wherein
the liquid carrier comprises 1,1,1,2,2,4,5,5,5-nonafluoro-4-(trifluoromethyl)pentan-3-one and isopropanol;
the curing agent comprises tert-Butyl peroxybenzoate;
the metal cation is derived from magnesium acetate, and
the ionic liquid comprises 1-Butyl-1-(3,3,4,4,5,5,6,6,7,7,8,8,8-tridecafluorooctyl)imidazolium hexafluorophosphate or trihexyltetradecylphosphonium bis(trifluoromethylsulfonyl)amide.

17. A method according to claim 1, wherein
the liquid carrier comprises 1,1,1,2,2,4,5,5,5-nonafluoro-4-(trifluoromethyl)pentan-3-one;
the curing agent comprises tert-Butyl peroxybenzoate;
the metal cation is derived from magnesium acetate, and
the ionic liquid comprises 1-Butyl-1-(3,3,4,4,5,5,6,6,7,7,8,8,8-tridecafluorooctyl)imidazolium hexafluorophosphate or trihexyltetradecylphosphonium bis(trifluoromethylsulfonyl)amide.

18. A method according to claim 1, wherein the ionic liquid comprises 1-Butyl-1-(3,3,4,4,5,5,6,6,7,7,8,8,8-tridecafluorooctyl)imidazolium hexafluorophosphate.

19. A method according to claim 1, wherein the ionic liquid comprises trihexyltetradecylphosphonium bis(trifluoromethylsulfonyl)amide.

20. A method of curing a surface of an uncured polysulfide rubber, the method comprising contacting an uncured polysulfide rubber with a composition comprising a polysulfide rubber curing agent, a metal cation, an ionic liquid, and a liquid carrier, wherein the polysulfide rubber curing agent comprises tent-butyl peroxybenzoate, disulfiram or a mixture thereof.

21. A method for sealing a gaps between adjoining or connected solid surfaces on an aircraft, comprising applying a polysulfide rubber to the gap to form an uncured seal over the gap, and contacting the uncured seal with a composition comprising a polysulfide rubber curing agent, a metal cation, an ionic liquid, and a liquid carrier, wherein the polysulfide rubber curing agent comprises tert-butyl peroxybenzoate, disulfiram or a mixture thereof.

* * * * *